United States Patent [19]
Davich

[11] 3,727,996
[45] Apr. 17, 1973

[54] THRUST BEARING SYSTEM

[75] Inventor: Michael Davich, Fort Wayne, Ind.

[73] Assignee: General Electric Company, Fort Wayne, Ind.

[22] Filed: Apr. 20, 1971

[21] Appl. No.: 135,581

[52] U.S. Cl. .................................................308/132
[51] Int. Cl. ..............................................F16c 33/66
[58] Field of Search ........................308/132; 310/90

[56] References Cited

UNITED STATES PATENTS

| | | | |
|---|---|---|---|
| 2,739,020 | 3/1956 | Howes | 308/132 |
| 3,235,317 | 2/1966 | Cunningham | 308/132 |

Primary Examiner—Charles J. Myhre
Assistant Examiner—Frank Susko
Attorney—John M. Stoudt, Radford M. Reams, Ralph E. Krisher, Jr., Allard A. Braddock, Joseph B. Forman, Frank L. Neuhauser and Oscar B. Waddell

[57] ABSTRACT

A thrust bearing system for use in rotating machines such as electric motors. An end shield is formed with an axially extending hub having a central, axially extending bearing surface and a feed aperture communicating with the bearing surface. A lubricant chamber is formed around the hub and contains a mass of lubricant filled absorbent material with part of the absorbent material extending into the feed aperture. A shaft is rotatably received within the bearing surface. A thrust bearing member is mounted on the shaft and has a thrust bearing surface disposed in a generally radial plane adjacent one end of the hub. A thrust receiving member is positioned in thrust receiving relationship between the thrust bearing surface and the one end of the hub. A retainer is press fit about the outer periphery of the hub and is interconnected with the thrust receiving member to center it about the shaft and restrain it from rotary motion. The retainer includes an outer peripheral flange which engages the absorbent material. The thrust receiving member normally engages the hub only adjacent its outer circumference and flexes into greater engagement with the hub when engaged by the thrust bearing member. The thrust bearing member includes an axially extending ledge which is received within the inner periphery of the thrust receiving member.

9 Claims, 4 Drawing Figures

3,727,996
Patented Apr 17 1973
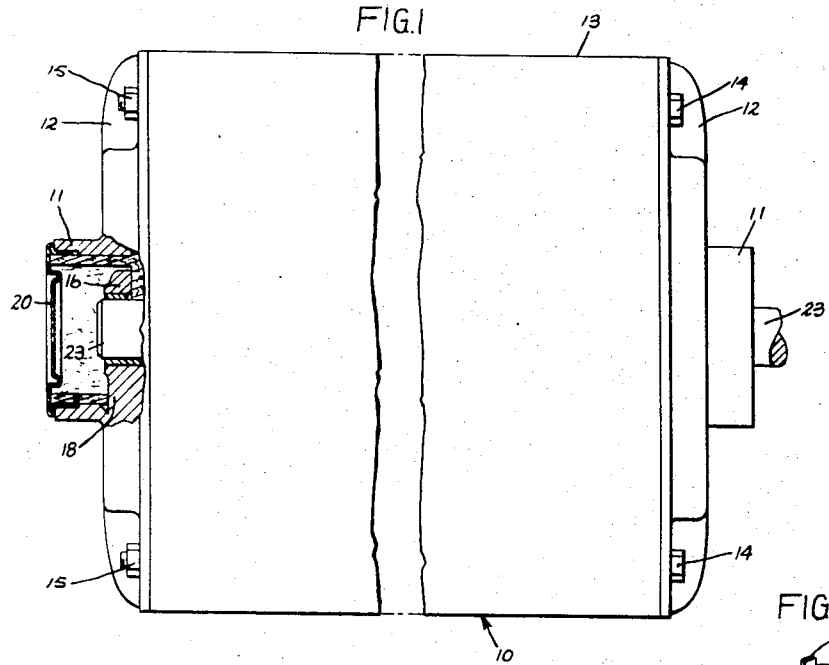
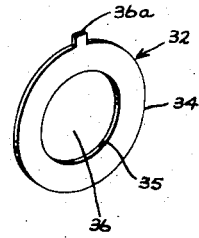
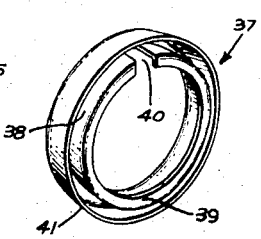
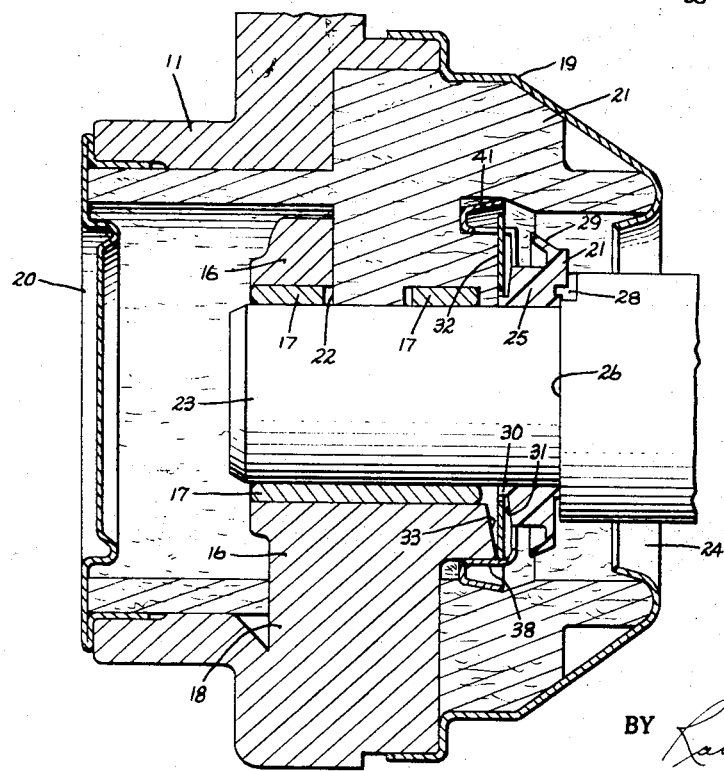
INVENTOR:
Michael Davich,
BY Radford M. Reams
ATTORNEY.

THRUST BEARING SYSTEM

BACKGROUND OF THE INVENTION

The present invention relates to a bearing system and, more particularly, to a thrust bearing system or arrangement for use with rotating machines such as electric motors, for instance.

Rotating machines such as electric motors normally include thrust bearing systems which take up or absorb end play or end bump of the rotating shaft. Such systems should absorb such end play without excess noise and should expeditiously dissipate the heat generated by their action. The heat dissipation is enhanced by lubricating the system; however, at the same time the system should not cause loss of lubricant. The thrust bearing system should be simple in design and easy to assemble while, at the same time, it should be sure in operation.

SUMMARY OF THE INVENTION

Accordingly, it is an object of the present invention to provide an improved thrust bearing system for use in rotating machines such as electric motors.

It is a further object of the present invention to provide such a thrust bearing system having proper lubrication without causing any undue loss of lubricant.

Yet another object of the present invention is to provide an improved thrust bearing which minimizes "end bump" noise and, at the same time, possesses excellent heat transfer characteristics.

Yet another object of this invention is to provide such an improved thrust bearing system which is simple in design, easy to assemble and sure in operation.

The invention, in one form thereof, provides a bearing system including an axially extending hub having a central, axially extending bearing surface. A shaft is rotatably received within the bearing surface. Means, associated with the shaft, form a thrust bearing surface disposed in a plane extending outwardly from the axis of the shaft adjacent one axial end of the hub. A thrust receiving member is positioned in thrust receiving relationship between the one end of the hub and the thrust bearing surface. The thrust receiving member normally engages the one end of the hub only adjacent its outer periphery and flexes into greater engagement with the one end of the hub in response to engagement by the thrust bearing surface. A retainer fits tightly about the outer periphery of the hub adjacent the one end thereof and is interconnected with the thrust receiving member for restraining the thrust receiving member from rotary movement.

The above-mentioned as well as other features and objects of this invention, as well as the manner of attaining them, will become more apparent and the invention itself will be better understood by reference to the following description, taken in conjunction with the accompanying drawing, wherein:

BRIEF DESCRIPTION OF THE DRAWING

FIG. 1 is a partial plan view of an electric motor, broken away at one end to reveal in cross section part of a bearing system in accordance with one form of the present invention;

FIG. 2 is an enlarged fragmentary view, partly in cross section, of the bearing system illustrated in part in FIG. 1;

FIG. 3 is a perspective view of the thrust receiving member used in the bearing system illustrated in FIGS. 1 and 2; and FIG. 4 is a perspective view of the retainer used in the bearing system illustrated in FIGS. 1 and 2.

DESCRIPTION OF THE PREFERRED EMBODIMENTS

Referring now to the drawings, particularly FIG. 1, there is shown an electric motor generally indicated at 10 having a pair of bearing housings 11 formed at each end in end shields 12. The end shields 12 are secured to the stator 13 by bolts 14 which pass through the stator and are threadedly received in nuts 15.

Referring particularly to FIG. 2 it will be seen that a generally axially extending hub 16 is provided in the center of the bearing housing 11 and has a central, axially extending annular bearing surface 17. Each hub 16 is supported in the corresponding bearing housing 11 through the usual medium of an inwardly extending spider 18.

The inward end of the cavity formed by housing 11 is closed by generally domed shaped cover 19 while the axially outer end of the cavity is closed by cover 20. The radially outer portions of the cavity are filled with a mass 21 of lubricant filled or impregnated absorbent material and a portion of the absorbent material extends through a feed aperture 22 provided in the hub 16 and bearing surface 17. While, for purposes of illustration the absorbent material or wick is illustrated as being a unitary body, quite often in practice it is formed by using a number of pieces of felt material which are cut so as to closely interfit with each other within the cavity.

A shaft 23 is rotatably received or mounted within the bearing surface 17 and extends through a central opening 24 provided in the cover 19 to the interior of the motor. As is well-known, the rotor for the motor 10 is mounted on the shaft 23 so that the shaft rotates with and in effect forms a part of the rotor. As the shaft rotates within the bearing surface 17, oil which is stored in the wick 21 is fed through the opening 22 in the hub and the wick wipes the surface of shaft 23 so as to provide proper lubrication between the shaft and the bearing surface 17.

In use, the load placed on the shaft 23 may cause the shaft to move axially of the stator, which movement is called end play or end bump. In order to control such end play the housing 11, at each end of the motor, includes a thrust bearing system or arrangement. A thrust bearing 25 is tightly mounted about the shaft 23 and rides against a radial flange 26 provided by a change in diameter of the shaft 23. The thrust bearing 25 includes a tab 27 which is received in a small recess 28 in the larger diameter portion of the shaft 23. The interconnection of the tab 27 and recess 28, as well as the relatively tight fit of the thrust bearing 25 about the shaft 23, assures that the thrust bearing rotates with the shaft. The thrust bearing 25 also includes an angled, generally outwardly extending flange 29 which acts to direct any oil reaching the radially outer portion of the bearing 25 back into the wick 21 so that the member 25 serves the dual purpose of being a thrust bearing and an oil return slinger. The portion of the thrust bearing 25 disposed toward the hub 16 includes a narrow flange or ledge 30 which extends axially along the shaft 23 and a thrust bearing surface 31 which extends outwardly from the shaft 23. The thrust bearing surface 31 is disposed generally radially of the shaft 23 although it may be inclined slightly away from the hub 16 as shown in FIG. 2.

A thrust receiving member 32 is positioned in thrust receiving relationship with the thrust bearing surface 31 between the bearing surface 31 and the adjacent end 33 of the hub 16. Viewing FIG. 3 it will be seen that the thrust receiving member or thrust washer 32 is a flat, generally ring like member having an outer periphery 34 and an inner periphery 35 with the inner periphery forming an opening 36 which is slightly larger than the outer periphery of the flange 30. A small tab or tang 36a extends outwardly from the outer periphery 34 of the thrust receiving washer.

Referring now to FIG. 4 there is shown a retainer 37 for mounting the thrust washer 32 to the hub 16. The retainer 37 includes a first generally cylindrical or circumferentially extending portion or barrel 38 having a small opening 40 formed therein. At one axial end of the barrel 38 the retainer is formed with a small radially inwardly extending flange 39. The opening 40 may extend through flange 39. At the other axial end of the axial end of the barrel 38, the retainer is return bent to form a radially outer flange 41. The flange 41 is angled with respect to the barrel 38 so that it extends back along the barrel and projects radially outward away from the barrel.

The thrust washer 32 is positioned within the barrel portion 38 of the retainer with the tab 36a projecting through the opening 40. The diameter of the barrel portion 38 is just larger than the diameter of the outer periphery 34 of the washer, and the radially inwardly extending flange 39 overlaps the washer. This arrangement rather exactly positions the washer 32 within the retainer 37. Thereafter, as shown in FIG. 2, the retainer is mounted on the hub 16 with the barrel portion 38 mounted about the outer periphery of the hub 16 adjacent the end 33 of the hub. The barrel portion 38 of the retainer is provided with an appropriate diameter so that it can be press fit on the outer periphery of the hub 16. With the tight fit provided by pressing the retainer on the hub the retainer will not rotate with respect to the hub. The interconnection between the retainer and the thrust washer provided by tab 36a and opening 40 prevents the thrust washer from rotating with respect to the hub. The retainer 37 also properly positions the thrust washer 32 so that the flange 30 is received within the central opening 36 of the washer without engaging the inner periphery 35.

As indicated in FIG. 2 the end 33 of the hub 16 is undercut so that normally the end 33 and the thrust washer 32 are in engagement only adjacent their outer peripheries. As the shaft 23 moves to the left (as seen in FIG. 2), the bearing surface 31 will engage the thrust washer 32 to take up the end play or axial thrust. The thrust washer 32 is free to flex axially of the shaft so that, if the axial bump or axial thrust force is large, the thrust washer 32 will flex into greater engagement with the end 33 of the hub 16. Such flexing into greater engagement with the hub 16 under greater force end bumps provides at least two advantages. Firstly the flexing of the washer 32 greatly reduces any noise attendant to end bump. Also the greater engagement between the washer 32 and hub end 33 provides a larger surface for transfer of heat away from the thrust washer to the stationary structure of the motor under larger thrust loads, at which time more heat is generated.

As the shaft 23 rotates and the wick 21 wipes oil on the surface of the shaft at opening 22, a portion of the oil will be picked up by the flange 30 of thrust washer 25 and centrifugal force will cause such oil to flow over the thrust bearing surface 31 toward the radial outer edge of the thrust washer. This oil provides proper lubrication between the thrust bearing 25 and the thrust washer 32. Any oil reaching the radially outer edge of flange 29 is thrown off the flange back into the wick 21 so as to be conserved. If the outer edge of the flange 29 were to physically contact the wick 21, oil could be picked up by the flange 29 and wasted, as by flowing down the thrust washer onto the larger diameter portion of the shaft 23 for movement to the interior of the motor. The outer flange 41 of the retainer 37 has a somewhat larger diameter than the outer flange 29 of the thrust washer 25 and engages the wick 21 so as to positively retain the wick away from the thrust washer 25 and prevent any waste of lubricant by contact between the thrust washer and wick.

It will be understood that the bearing arrangement on the right-hand end of motor 10 (as seen in FIG. 1) may be the same as that illustrated with the exception that the cover would have an opening in it rather than being closed as illustrated at 20 so that the right-hand end of the shaft 23 could extend out of the housing 11 for attachment to suitable equipment to be driven by the motor.

It should be apparent to those skilled in the art that while I have described what, at present, is considered to be the preferred embodiments of this invention, in accordance with the Patent Statutes, changes may be made in the disclosed apparatus without actually departing from the true spirit and scope of this invention and it is therefore aimed in the appended claims to cover all such equivalent variations as fall within the true spirit and scope of the invention.

What I claim as new and desire to secure by Letters Patent of the United States is:

1. A bearing system including: an axially extending, stationary hub having a central, axially extending bearing surface; a shaft rotatably received within said surface; means associated with said shaft forming a thrust bearing surface disposed in a plane extending outwardly from the axis of said shaft adjacent one axial end of said hub; a thrust receiving member positioned in thrust receiving relationship between said one end of said hub and said thrust bearing surface; said thrust receiving member normally engaging said one end of said hub only adjacent its outer periphery and flexing into greater engagement with said one end of said hub in response to engagement by said thrust bearing surface; and a retainer having a tight fit about the outer periphery of said hub adjacent said one end thereof and interconnected with said thrust receiving member to substantially prevent rotary movement of said thrust receiving member.

2. A bearing system as set forth in claim 1 wherein: said retainer includes a first circumferential portion adapted to fit tightly about said hub and closely overlie the radially outer edge of said thrust receiving member and a generally radially disposed flange extending inwardly from said first portion to overlap said thrust receiving member.

3. A bearing system as set forth in claim 1 wherein: a mass of lubricant impregnated absorbent material is provided about said stationary hub; said retainer including an outer peripheral flange, of greater diameter than said thrust bearing surface, engaging said mass of absorbent material.

4. A bearing system, for use in an electric motor, comprising an end shield formed with an axially extending hub; said hub having a central axially extending bearing surface and a feed aperture communicating with said bearing surface; means including a cover member forming a lubricant chamber around said hub; a mass of lubricant impregnated absorbent material disposed within said lubricant chamber, a portion of said absorbent material extending into said feed aperture; a shaft rotatably received within said bearing surface; a thrust bearing member mounted on said shaft for rotation therewith and having a thrust bearing surface disposed in a plane extending outwardly from said shaft adjacent one axial end of said hub; a thrust receiving member positioned in thrust receiving relationship with said thrust bearing surface; and a retainer having a tight fit about the outer periphery of said hub adjacent said one end thereof and interconnected with said thrust receiving member to substantially prevent rotary movement of said thrust receiving member.

5. A bearing system as set forth in claim 4 wherein said retainer includes a first, circumferential portion adapted to fit tightly about said hub and closely overlie the radially outer edge of said thrust receiving member and a generally radially disposed flange extending inwardly from said first portion to overlap said thrust receiving member.

6. A bearing system as set forth in claim 4 wherein: said retainer is provided with at least one opening and said thrust receiving member includes at least one tang received in the at least one opening for restraining said thrust receiving member from rotary motion.

7. A bearing system, for use in an electric motor, comprising an end shield formed with an axially extending hub; said hub having a central axially extending bearing surface and a feed aperture communicating with said bearing surface; means including a cover member forming a lubricant chamber around said hub; a mass of lubricant impregnated absorbent material disposed within said lubricant chamber, a portion of said absorbent material extending into said feed aperture; a shaft rotatably received within said bearing surface; a thrust bearing member mounted on said shaft for rotation therewith and having a thrust bearing surface disposed in a plane extending outwardly from said shaft adjacent one axial end of said hub; a thrust receiving member positioned in thrust receiving relationship with said thrust bearing surface; and a retainer having a tight fit about the outer periphery of said hub adjacent said one end thereof and interconnected with said thrust receiving member for restraining said thrust receiving member from rotary movement; said retainer including an outer peripheral flange, of greater diameter than said thrust bearing member, engaging said mass of absorbent material.

8. A bearing system as set forth in claim 4 wherein: said one end of said hub is undercut; said thrust receiving member normally engaging said one end of said hub only adjacent its outer periphery and flexing into greater engagement with said one end of said hub in response to engagement by said thrust bearing member.

9. A bearing system as set forth in claim 4 wherein: said thrust receiving member has an inner peripheral edge spaced from said shaft and said thrust bearing member includes a ledge extending axially of said shaft and adapted to be received within said inner peripheral edge of said thrust receiving member.

* * * * *